(12) United States Patent
Slater et al.

(10) Patent No.: US 8,221,060 B2
(45) Date of Patent: Jul. 17, 2012

(54) SEALING MEANS

(75) Inventors: Richard M. Slater, Bristol (GB); Robert W. Woodfield, Chepstow (GB)

(73) Assignee: Rolls-Royce PLC, London (GB)

( * ) Notice: Subject to any disclaimer, the term of this patent is extended or adjusted under 35 U.S.C. 154(b) by 489 days.

(21) Appl. No.: 12/457,743

(22) Filed: Jun. 19, 2009

(65) Prior Publication Data

US 2010/0040463 A1 Feb. 18, 2010

(30) Foreign Application Priority Data

Aug. 18, 2008 (GB) .................................. 0814981.7

(51) Int. Cl.
*F01D 9/02* (2006.01)
(52) U.S. Cl. .................. 415/173.1; 415/174.3
(58) Field of Classification Search ............... 415/173.1, 415/173.3, 174.3; 416/193 A, 248
See application file for complete search history.

(56) References Cited

U.S. PATENT DOCUMENTS

| | | | |
|---|---|---|---|
| 3,248,081 A | | 4/1966 | Bobo et al. |
| 5,480,162 A | * | 1/1996 | Beeman, Jr. .................. 277/355 |
| 5,667,224 A | * | 9/1997 | Streckert et al. .............. 277/634 |
| 5,693,288 A | * | 12/1997 | Nakamura ..................... 266/103 |
| 5,957,658 A | * | 9/1999 | Kasprow et al. .............. 415/134 |
| 6,260,854 B1 | | 7/2001 | Lemon |
| 6,312,218 B1 | * | 11/2001 | Beeck et al. ................ 415/173.7 |
| 6,398,499 B1 | * | 6/2002 | Simonetti et al. ......... 416/193 A |
| 7,364,166 B2 | * | 4/2008 | Yoakam et al. ............... 277/616 |
| 7,918,643 B2 | * | 4/2011 | Weaver ....................... 415/171.1 |
| 2004/0145124 A1 | | 7/2004 | Yoakam et al. |
| 2010/0152700 A1 | * | 6/2010 | Paine ............................ 604/506 |

FOREIGN PATENT DOCUMENTS

EP 1914389 * 4/2008

OTHER PUBLICATIONS

Bergander, Turbine Blade With Separated Seal Element, Apr. 23, 2008, EP1914389 abstract.*

* cited by examiner

*Primary Examiner* — Edward Look
*Assistant Examiner* — Liam McDowell
(74) *Attorney, Agent, or Firm* — Oliff & Berridge, PLC

(57) ABSTRACT

A sealing arrangement for sealing between segments of a component assembly. The sealing arrangement includes a sealing member having a mating surface for mating with the surface of the segment. The sealing arrangement further includes a location member removably attached to the sealing member along a transition region therebetween, and also a free end distal to the sealing member. The location member is configured to engage a location feature of the segment so as to locate the mating surface of the sealing member in a fixed position on the surface of the segment relative to the location feature. The location member is configured to be detached from the sealing member along the transition region and be removed from the segment after the sealing member has been bonded to the segment.

22 Claims, 4 Drawing Sheets

SEALING MEANS

FIELD OF INVENTION

The present invention relates to a sealing means for sealing between components of a component assembly.

In particular the invention is concerned with a sealing means comprising a sealing member with a detachable location member for sealing between components of a component assembly.

BACKGROUND OF THE INVENTION

A conventional fan and/or compressor assembly includes rotor blades interspaced with static vane stages which occupy a duct which defines a path down which fluid being pressurised will pass. A gap is provided between the rotatable and static components to permit relative rotation. In order to optimise efficiency of the system, it is important to minimise this gap in order to limit leakage of the air being pressurised. Typically this is achieved by either designing the gap to be as small as possible and/or by the provision of a sealing member which extends across at least part of the width of the gap. Conventionally a thin metal sealing member is located in a groove in the stator vane platform. The sealing member obstructs the gas flow through the gap and is thin enough that, in the event of excessive relative axial movement of the stator vane and rotor blade, it is easily deformed without causing damage to the vane or blade.

However, since the edge of the groove in the platform in which the sealing member steps down to the sealing member, it will inherently introduce a discontinuity into the gas washed surface of the platform, thus introducing a disturbance to the flow. Also, in builds where a composite vane is used to reduce weight of the system, a groove in the platform will significantly reduce the strength of the vane and may result in composite structure coming apart. It should also be noted that the location of the sealing member is critical, since it must provide a seal without interfering with the gas flow over the platform. That is to say, it must occupy a location predefined in the design of the compressor and be neither too far inset or too proud of the gas washed surfaces of adjacent platforms. In the absence of a location groove, this is achieved using dedicated jigs, fixtures and tooling to which are expensive to produce and time consuming to use.

Hence a sealing means which can be easily located in a desired position on vane platforms is highly desirable.

SUMMARY OF THE INVENTION

According to a first aspect of the present invention there is provided a sealing means for sealing between segments of a component assembly comprising a sealing member having a mating surface for mating with the surface of the segment;
a location member removably attached to the sealing member along a transition region therebetween and having a free end distal to the sealing member,
the location member being configured to engage a location feature of the segment so as to locate the mating surface of the sealing member in a fixed position on the surface of the segment relative to the location feature,
the location member being configured to be detached from the sealing member along the transition region and removed from the segment after the sealing member has been bonded to the segment.

The advantage of this arrangement is that the sealing member can be easily and accurately located on a component without the need for a dedicated location feature. The location feature may be any feature on the segment of the component. Any existing feature can be used, including features provided for functions which are entirely unconnected to the present invention. That is to say, any feature on the surface of the segment can be employed as a location feature provided it has a fixed location relative to the position on the segment where the sealing member is to be mated to the segment. Thus no dedicated location feature on the segment is required to locate the sealing member. This is particularly advantageous for segments made from composite materials as having a continuous surface without location features, such as holes or groove, will maintain the integrity of the vane.

In one embodiment of the present invention there is provided a compressor vane segment for a compressor vane array comprising a sealing member provided on at least one of the upstream or downstream edges of the vane segments.

In another embodiment of the present invention there is provided a method of assembly of a compressor vane segment for a compressor vane array comprising the steps of a) applying a bonding agent to the mating surface of the sealing member;
b) engaging the location member with the location feature on the segment, thereby locating the sealing member in a fixed position on the surface of the segment relative to the location feature;
c) applying heat and/or pressure to the mating surface so as to achieve a bond between the sealing member and segment; and
d) disengaging the location member from the location feature and detach the location member from the sealing member along the transition region.

This product and method provide the advantage that the sealing means can be located accurately and precisely on rotor blade and stator vane platform segments without the need for providing dedicated location features.

BRIEF DESCRIPTION OF THE DRAWINGS

Embodiments of the invention will now be described with reference to the accompanying drawings, in which.

DETAILED DESCRIPTION OF EMBODIMENTS

Figure 1:
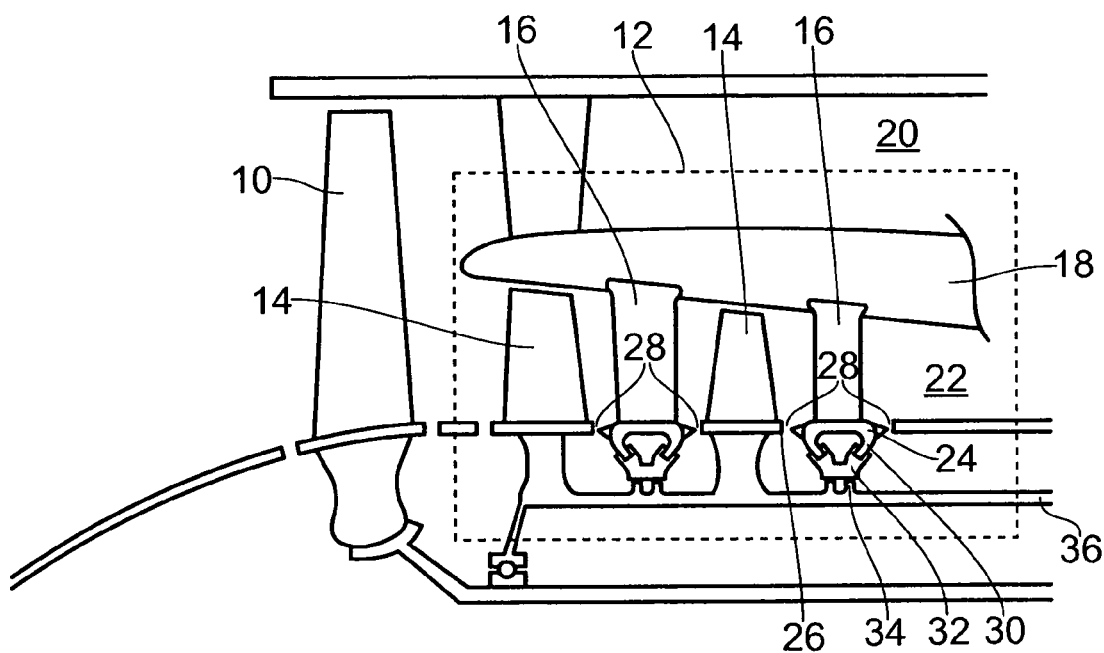
FIG. 1 shows a section of a fan and compressor according to the present invention.

FIG. 1 shows a section of a fan 10 and compressor section 12 of a gas turbine engine according to the present invention. However, it will be appreciated that the present invention may also be applied to a compressor unit which is separate to a gas turbine engine, such as those configured for direct propulsion. The compressor 12 comprises rows of rotor blade segments 14 interspaced with static vane stage segments 16. A casing 18 defines a bypass duct 20 and an intake 22 in which the blades 14 and vanes 16 are located. The blade segments 14 and vane segments 16 each comprise a platform 24, 26 respectively, and a gap 28 is provided between the platforms 24, 26 to permit relative rotation. The vane platforms 24 each terminate in a leg 30 to which is attached a sealing land 32 for sealing against a labyrinth seal 34 provided on a shaft 36 to which the rotor blades 14 are mounted.

Figure 2:
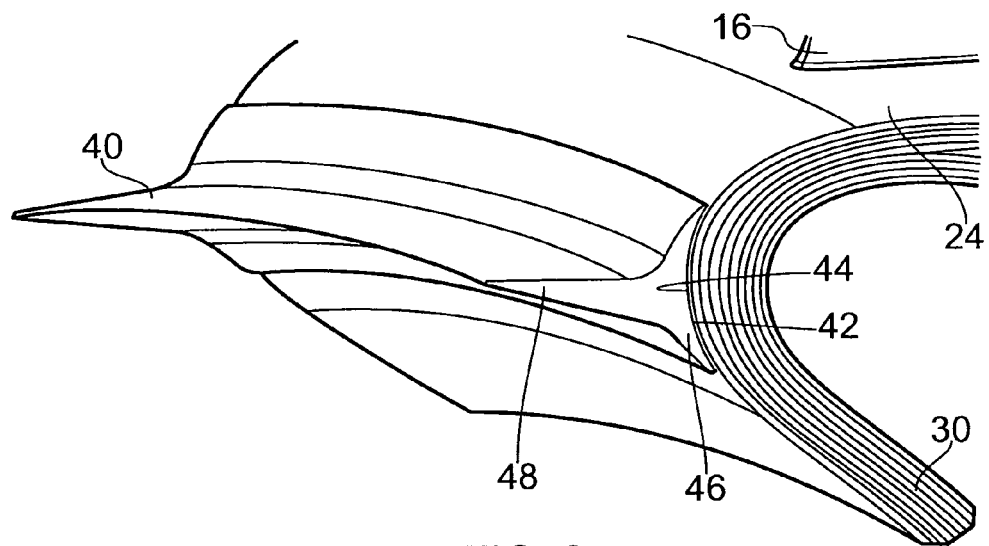
FIG. 2 is an enlarged perspective view of a stator vane platform of the compressor shown in FIG. 1 showing a sealing member.
Figure 3:
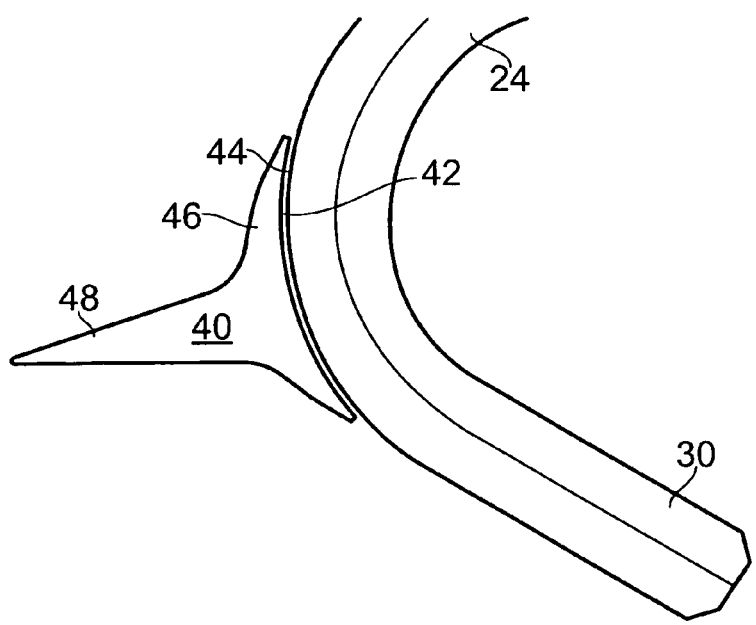
FIG. 3 is a section through the platform shown in FIG. 2.

An enlarged view of the vane platform 24 is shown in FIG. 2 and 3. A sealing member 40 according to the present invention is provided on at least one of the upstream or downstream edges of the platforms 24 the vane segments 16. The sealing member 40 has a mating surface 42 which is bonded to a mating surface 44 of the platform 24. In the embodiment shown, the sealing member has a "T" cross section, with an outer flat portion 46 of the "T" providing the mating surface 42 and a leg portion 48 extending substantially at right angles away from the mating surface 42. The leg portion 48 tapers to a point at an end distal to the mating surface 42 and flat portion 46. The sealing member 40 is sized to extend across the gap 28 between the blade 14 and vane 16 platforms 24, 26. In use, the sealing member 40 dissuades air passing from the intake 22 between the blade 14 and vane 15 platforms 24, 26.

Figure 4:
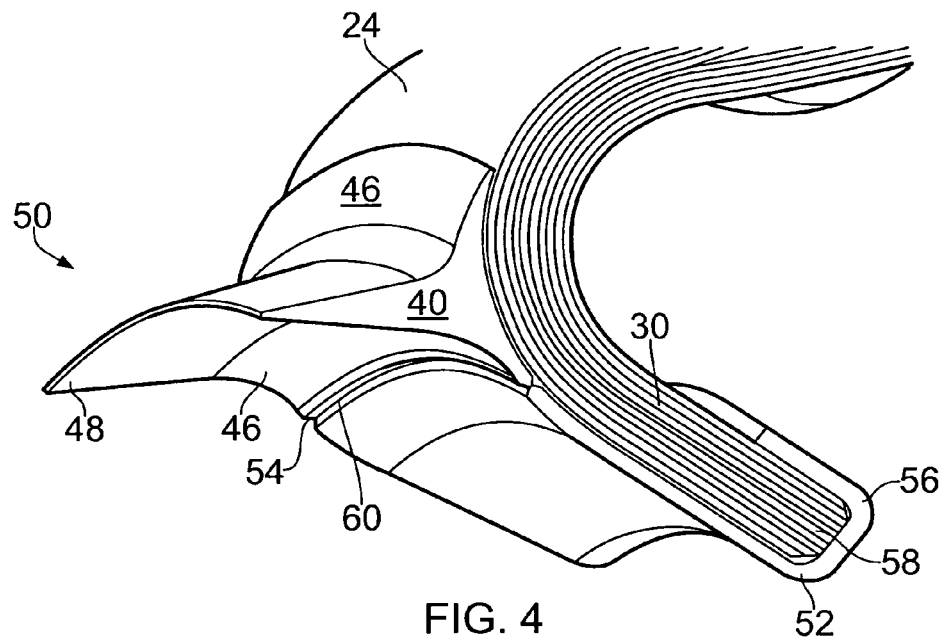
FIG. 4 is a perspective view of the platform of FIGS. 2 and 3 partway through its manufacturing process with the sealing member and its respective location member.
Figure 5:
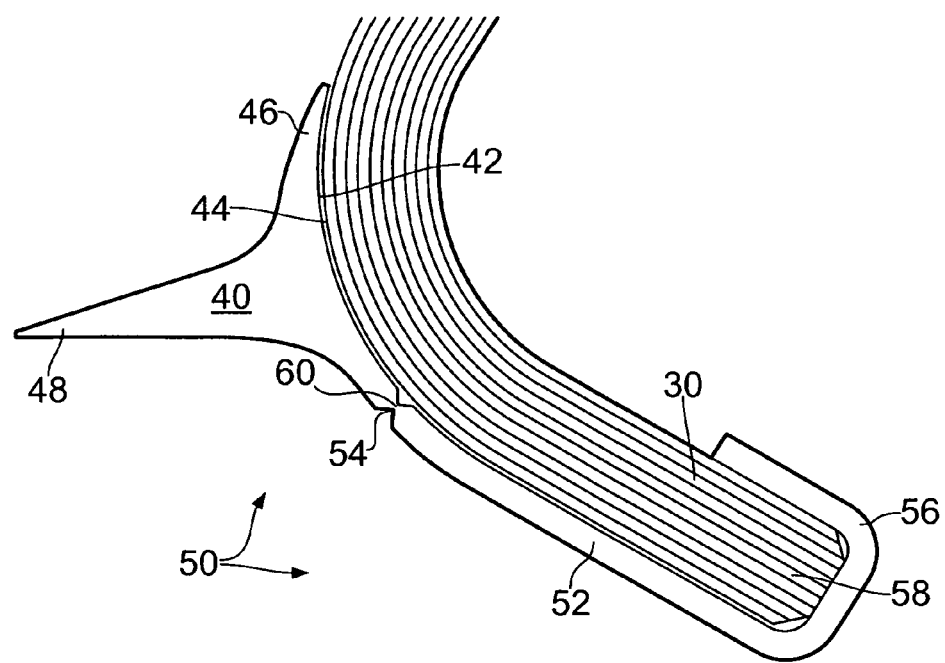
FIG. 5 is a section through the platform shown in FIG. 4.

In the embodiment shown, the vane 16 and platform 24 is made from a composite material, for example an organic matrix carbon composite. With such a structure it is beneficial to avoid stress raising features like grooves and holes to locate and fix the sealing member 40 in a desired location on the platform 24. As shown in FIG. 4 and 5, a sealing means 50 according to the present invention comprising the sealing member 40 and a location member 52 allows for the sealing member 40 to be accurately located on the platform 24. The sealing means 50 comprises the location member 52 removably attached to the sealing member 40 along at a transition region 54 therebetween. The location member 52 has a free end 56 distal to the sealing member 40 and is configured to engage a location feature 58 of the vane segment 16, which in this embodiment is the free end of leg 30. The location member 52 conforms to the shape of the surface of the segment 16 in the region where it engages with the segment 16, and is hook shaped to fit around the leg portion 30 and thus locate the mating surface 42 of the sealing member 40 in a fixed position on the mating 44 surface of the segment platform 24 relative to the free end of the leg portion 30.

The location member 52 is configured to be detached from the sealing member 40 along the transition region 54 and removed from the vane segment 16 after the sealing member 40 has been bonded to the vane segment 16. The transition region 54 is provided with a weakened region 60 which divides the sealing member 40 and location member 52.

The sealing means 50, that is to say, the sealing member 40 and location member 52, are formed integrally from the same material. Preferably the sealing member 40 and location member 52 are made from an elastomer. In a further preferred embodiment the elastomer comprises silicone reinforced with carbon fibre dust, where the carbon fibre dust increases the wear resistance of the sealing member 40.

The mating surface 42 of the sealing member 40 is bonded to the mating surface 44 of the vane segment 16 by a bonding agent. For mating surfaces comprising an organic matrix carbon composite and an elastomer, the bonding agent is preferably a fluoro elastomer adhesive.

The sealing member 40 is attached to the platform 24 by a process including the steps of applying a bonding agent to the mating surface 42 of the sealing member 40 and engaging the location member 52 with the location feature 30 on the segment 16 to thereby locate the sealing member 40 in a fixed position on the surface 44 of the segment 16 relative to the location feature 30. Heat and/or pressure is then applied to the mating surfaces 42, 44 so as to achieve bonding between the sealing member 40 and segment 16. The location member 52 is then disengaged from the location feature 30 and detached from the sealing member 40 along the transition region 54. The weakened region 60 provides a discrete line along which the sealing means 50 can be cut and/or torn to detach the location member 52 from the sealing member 40.

Figure 6:
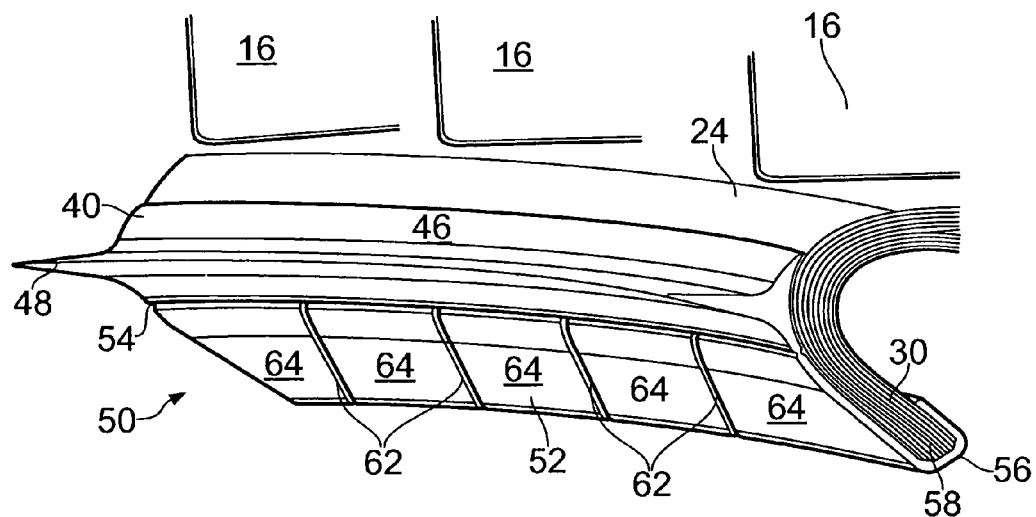
FIG. 6 is a perspective "front" view of the platform with an alternative embodiment of a sealing member and location member according to the present invention.
Figure 7:
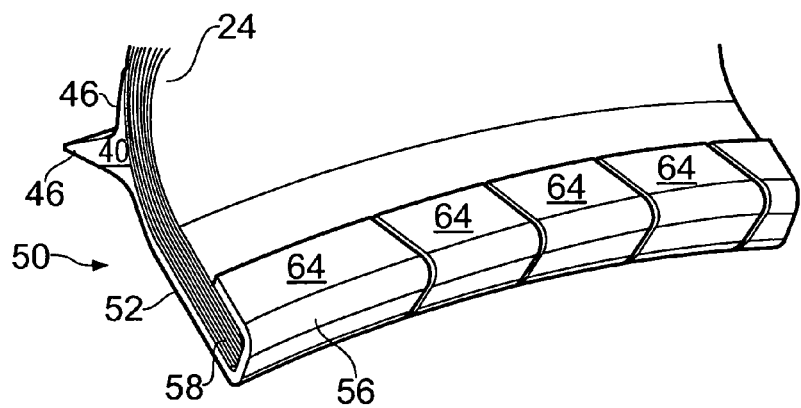
FIG. 7 is perspective "rear" view of the platform, sealing member and location member of FIG. 6.

A further embodiment of the present invention is shown in FIGS. 6 and 7. In all respects the sealing means 50 is identical to the sealing means of FIGS. 4 and 5, other than at least one weakened region 62 extends at an angle from the transition region 54 towards free end 56 of the location member 52. This provides a number of sectors 64 which can be removed from the leg 30, thus making the overall operation of removing location member 52 easier. Also sectors 64 of the location member 52 can be removed prior to engagement with the location member 30 to avoid distortion of the sealing means 50 should the radius of the arc of the platform 24 be small.

The sealing means 50 can be provided as a continuous strip or in segmented in pieces sized to fit each vane segment 16.

The present invention ensures the sealing member 40 can be located quickly and easily during manufacture of the vane segment 16, and thus eliminates the need for location features such as grooves or holes in the surface of the platform 24, as well as obviating the need for expensive and complex jigs, fixtures or tooling to position the sealing member 40 in the correct location. The location member 52 guarantees correct axial and radial location of the sealing member 40. Since the location member 52 is removed after the sealing member 40 has been bonded in place, the feature used as a location feature, in this case the free end 58 of the leg portion 30, can subsequently be used as intended without modification to other components. In this example, this means the sealing land 32 can be mounted on the leg portions 30 without modification.

Additionally the sealing means 50 and method of assembly according to the present invention ensure the sealing member 40 cannot be fitted incorrectly as the location feature 52 will only permit assembly in one orientation.

The invention claimed is:

1. A sealing arrangement for sealing between segments of a component assembly comprising:
    a sealing member having a mating surface for mating with a surface of a segment; and
    a bonding agent disposed between the mating surface of the sealing member and the surface of the segment;
    wherein the sealing arrangement further comprises a location member removably attached to the sealing member along a transition region therebetween and having a free end distal to the sealing member,
    the location member being configured to engage a location feature of the segment so as to locate the mating surface of the sealing member in a fixed position on the surface of the segment relative to the location feature, and
    the location member being configured to be detached from the sealing member along the transition region and removed from the segment after the sealing member has been bonded to the segment via the bonding agent.

2. The sealing arrangement as claimed in claim 1 wherein the free end of the location member is hook shaped.

3. The sealing arrangement as claimed in claim 1 wherein the location member is configured to conform to the shape of the surface of the segment in at least the region where it engages with the segment.

4. The sealing arrangement as claimed in claim 1 wherein the transition region comprises a weakened region dividing the sealing member and the location member.

5. The sealing arrangement as claimed in claim 1 wherein at least one weakened region extends at an angle from the transition region towards the free end of the location member.

6. The sealing arrangement as claimed in claim 1 in wherein the sealing member and location member are formed integrally from the same material.

7. The sealing arrangement as claimed in claim 6 wherein the sealing member and location member are made from an elastomer.

8. The sealing arrangement as claimed in claim 7 wherein the elastomer comprises silicone reinforced with carbon fibre dust.

9. The sealing arrangement as claimed in claim 1 wherein the sealing member has only one mating surface.

10. The sealing arrangement as claimed in claim 1 wherein the bonding agent is an adhesive.

11. The sealing arrangement as claimed in claim 10 wherein the adhesive is a fluoro elastomer adhesive.

12. The sealing arrangement as claimed in claim 1 wherein the bonding agent has been affected by at least one of heat and pressure.

13. The sealing arrangement as claimed in claim 1 wherein the sealing member has a "T" cross section.

14. A compressor vane segment for a compressor vane array, the compressor vane segment comprising a sealing arrangement comprising:
  a sealing member having a mating surface for mating with a surface of the compressor vane segment;
  wherein the sealing arrangement further comprises a location member removably attached to the sealing member along a transition region therebetween and having a free end distal to the sealing member,
  the location member being configured to engage a location feature of the compressor vane segment so as to locate the mating surface of the sealing member in a fixed position on the surface of the compressor vane segment relative to the location feature,
  the location member being configured to be detached from the sealing member along the transition region and removed from the compressor vane segment after the sealing member has been bonded to the compressor vane; and
  the sealing arrangement is provided on at least one of an upstream or downstream edge of the compressor vane segment.

15. The compressor vane segment as claimed in claim 14 wherein the compressor vane segment comprises a leg portion which extends away from the sealing arrangement, whereby the location feature is provided on the leg portion.

16. The compressor vane segment as claimed in claim 15 wherein the location feature is a free end of the leg portion, the location member being configured to engage around the free end of the leg portion.

17. The compressor vane segment as claimed in claim 14 wherein the compressor vane segment comprises a composite material.

18. The compressor vane segment as claimed in claim 14 wherein the sealing member is bonded to the compressor vane segment by a bonding agent.

19. The compressor vane segment as claimed in claim 18 wherein the bonding agent is a fluoro elastomer adhesive.

20. A method of assembly of a sealing arrangement on a compressor vane segment for a compressor vane array, the method comprising the steps of:
  a) applying a bonding agent to a mating surface of a sealing member;
  b) engaging a location member with a location feature on the compressor vane segment, thereby locating the sealing member in a fixed position on the surface of the compressor vane segment relative to the location feature;
  c) applying heat and/or pressure to the mating surface so as to achieve a bond between the sealing member and the compressor vane segment; and
  d) disengaging the location member from the location feature and detaching the location member from the sealing member along the transition region.

21. The method as claimed in claim 20 wherein the method further comprises the step of removing sectors of the location member prior to engagement with the location feature on the compressor vane segment.

22. The method of assembly as described in claim 20 wherein the sealing arrangement is provided on at least one of an upstream or downstream edge of the compressor vane segment.

* * * * *